United States Patent [19]
Lekarski et al.

[11] 3,805,841
[45] Apr. 23, 1974

[54] FLUID LOGIC ELEMENTS

[75] Inventors: Simeon Lekarski, Saint-Cloud; Pierre Hardy; Leon Hardy, both of Paris, all of France

[73] Assignee: Jean Gachot, Enghien-les-Bains, France; a part interest

[22] Filed: Oct. 2, 1972

[21] Appl. No.: 294,287

[30] Foreign Application Priority Data
Oct. 5, 1971  France .............................. 71.35862

[52] U.S. Cl... 137/627.5, 137/596.18, 235/201 ME, 251/65
[51] Int. Cl. .......................................... F16k 11/14
[58] Field of Search .............. 235/201 ME; 251/65; 137/596.18, 627.5

[56] References Cited
UNITED STATES PATENTS

| | | | |
|---|---|---|---|
| 2,991,805 | 7/1961 | Page ........................ | 235/201 ME X |
| 3,605,807 | 9/1971 | Paschke .................... | 235/201 ME X |
| 3,527,248 | 9/1970 | Pick .............................. | 251/65 X |
| 2,412,725 | 12/1946 | Fitch ............................. | 251/65 X |

*Primary Examiner*—Robert G. Nilson

[57] ABSTRACT

A fluid logic element has a space in which a main valve member is movable under the influence of fluid pressure. The valve member is permanently magnetised so as to be biased towards a magnetic face of the wall of the space. At least one auxiliary orifice opens into the space, and an auxiliary valve member controls this orifice and is juxtaposed for activation by the main valve member.

7 Claims, 2 Drawing Figures

FLUID LOGIC ELEMENTS

BACKGROUND OF THE INVENTION

This invention relates to improvements in fluid logic elements and in circuits for calculation and control comprising such elements.

Fluid logic elements have been proposed in which at least one free valve member is movably mounted in an enclosure having orifices which are connected to the logic circuit and of which at least one enables the admission of fluid capable of displacing the valve member from one position to another. The valve member is subjected both to the action of the fluid and to at least one magnetic field for holding it in at least one predetermined position.

However, logic elements made as proposed above do not have a permanent and independent fluid input, and the fluid tightness of several orifices is difficult to assure with only one valve member.

In order to overcome this disadvantage, in accordance with the present invention several valve members are used to ensure fluid tightness of the orifices.

BRIEF SUMMARY OF THE INVENTION

In accordance with the invention, the logic element comprises an enclosed space including a main valve member comprising a permanent magnet capable of being attracted to at least one of the magnetic faces of the said space, the space having at least one orifice in which is slidably mounted an auxiliary valve member capable of being activated by the main valve member for selectively connecting the said space and a return passage with a feed passage of the logic circuit.

DESCRIPTION OF THE DRAWINGS

Other features and advantages of the invention will be better understood from the following description of several embodiments with reference to the accompanying drawings in which.

DESCRIPTION OF PREFERRED EMBODIMENTS

Figure 1:
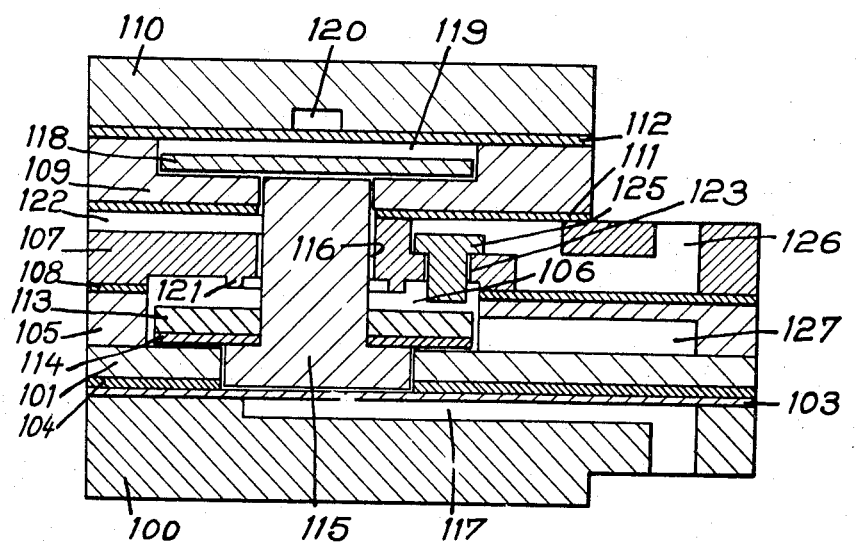
FIG. 1 is a longitudinal sectional view of an improved logic element according to the invention.

The logic element shown in FIG. 1 is built up of a stack of plates, and includes an exterior plate 100 on which is mounted a plate 101 of magnetic or magnetised material with a membrane 103 interposed between them. On the plate 101 is mounted a strengthening plate 105 hollowed out to provide a space 106 which is closed off by the plate 101 and by another plate 107 which is sealed by a seal 108.

On the plate 107 which may be magnetic or non-magnetic are mounted a plate 109 and an exterior plate 110, a fluid tight joint 111 being provided between the plate 107 and the plate 109, and a membrane 112 being interposed between the plate 109 and the plate 110.

In the space 106 is freely slidably mounted a main valve member 113 which is preferably made of an elastic material such as rubber incorporating a magnetised substance such as iron, to form a permanent magnet. This elastic material is fixed by adhesive on a thin metallic plate 114 which gives it rigidity.

Valve member 113 is fixed on a piston 115 which is slidably mounted in an orifice 116 of the plate 107, this piston 115 being subjected on one of its faces, through the intermediary of the membrane 103, to the action of fluid in a conduit 117 in plate 100, fluid in this conduit constituting a writing signal of the logic circuit. On its other face, the piston 115 is subjected, both through the intermediary of a plate 118 slidably mounted in a chamber 119, and of a membrane 112, to the action of fluid in a conduit 120 in a plate 110, this fluid constituting an erasing signal of the logic circuit.

On the face of the plate 107 directed towards the chamber 106 is provided a shoulder 121 against which the valve member 113 rests in its raised position, this shoulder ensuring fluid tightness between the chamber 106 and a passageway 122 connected to atmosphere, the chamber and passageway being connected by an annular space left between the orifice 116 and the piston 115.

Figure 2:
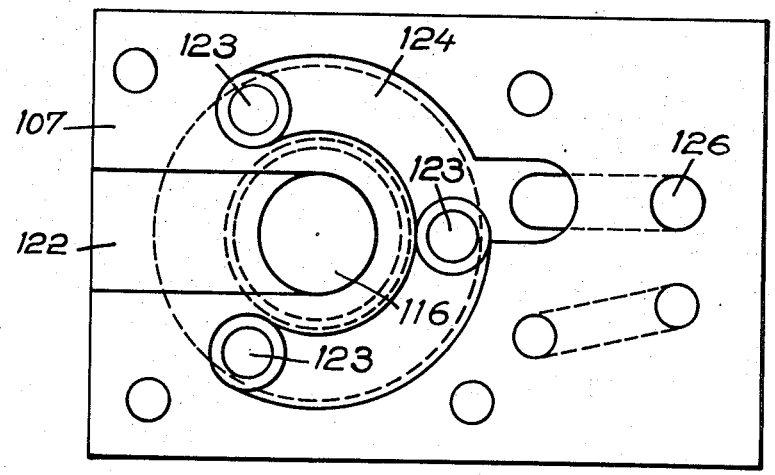
FIG. 2 is a plan view of a plate, in the logic element, which defines orifices in which are mounted secondary valve members.

In addition, the plate 107 presents a circular channel 124 in which are situated orifices 123 receiving (FIG. 2) auxiliary valve members 125 of elastic or plastics material, there being three auxiliary valve members in the embodiment shown, this number being varied according to the output and the activating forces.

These auxiliary valve members 125, which are held in an open position when the main valve member 113 is in its raised position, allow connection of the space 106 to an input conduit 126 of the logic circuit by means of an annular space between each valve member 125 and its orifice 123, the space 106 being permanently connected to a fluid output conduit 127.

The operation of the logic element is as follows.

In the absence of a control signal and when the stable position of the main valve member 113 is downwards, that is to say when it is attracted by the magnetic plate 101, the fluid entering conduit 126 passes into the circular channel 124 and holds the valve members 125 in their closed position.

In the presence of a writing signal in the form of fluid under pressure in the passage 117, the membrane 103 raises the piston 115 carrying the main valve member 113, and the latter raises the auxiliary valve members 125 and comes to rest against the shoulder 121.

The input fluid entering conduit 126 passes into the chamber 106 via the space formed between each auxiliary valve member 125 and its orifice 123, this fluid under pressure remaining in the chamber 106 because it is not able to pass into the exhaust conduit 122 by reason of the position of the main valve member 113 at rest against the shoulder 121.

By reason of the pressure difference between the lower and upper faces of the main valve member 113, a resultant force is produced which holds the main valve member in its raised position even in the absence of the writing signal.

In this state, the main valve member 113 can have two possible responses, in case of interruption of input, according to the type of the memory which can be bistable or monostable.

In the case of a monostable memory, that is to say when only the plate 101 is magnetic, if the input through the conduit 126 is cut, the valve member 113 returns downwards, due to the magnetic attraction force, against the plate 101. When the input reappears, the output 127 is no longer connected to the input conduit 126.

In the case of a bistable memory, that is to say when the plates 101 and 107 are both of magnetic material, if the input is cut, the main valve member 113 remains in its high position against the magnetic plate 107. Clearance of the memory is obtained by a signal in the form of pressurised fluid in conduit 120, this causing downwards displacement of the mobile assembly comprising the plate 118, the piston 115 and the valve member 113. The auxiliary valve members 125 close themselves to isolate the input conduit 126 from the chamber 106, the valve member 113 frees the passage under the shoulder 121 and the output fluid is directed towards atmosphere through the conduit 122 and the space between the piston 115 and the orifice 116.

If the return to zero signal diminishes, the memory remains in the zero state assuming that valve member 113 is attracted by the magnetic forces between the valve member and the magnetic plate 101.

The return to zero action has priority if the surface area of the plate 118 is greater than that of the surface of the piston 115. In the contrary case, it is the writing action which has priority.

The memory is an amplifier due to the fact that the control surfaces have areas greater than those of the surfaces subjected to the input or output pressures.

It will be understood that many modifications can be made by the man skilled in the art to the arrangements or methods which have been specifically described as non-limiting examples, without falling outside the scope of the invention.

We claim:

1. A fluid logic element comprising:
   wall means defining a space and orifice openings thereinto, said wall means further including a plate defining an aperture,
   a piston slidably mounted in the aperature,
   a main valve member rigidly supported on said piston within the said space,
   wall means including one elastic portion by means of which fluid pressure is applied to said piston to move it and said main valve member carried thereon in one direction from a first position toward a second position and a further elastic portion by means of which fluid pressure is applied to said piston to move it and the main valve member in another direction, from said second position toward said first position,
   means producing a magnetic force acting between said wall means and said main valve member to bias said main valve member into at least one of said first and second positions,
   an auxiliary valve member movably mounted in each of said respective orifice openings said auxiliary valve members in first positions closing said openings and in second positions permitting a flow of fluid under pressure into the space, a portion of each of said auxiliary valve members lying in the path of movement of said main valve member when moving from its said first position to its said second position, whereby said auxiliary valve members are actuated by said main valve member during its movement and said auxiliary valve members are urged from their first positions to their second positions.

2. A logic element according to claim 1, in which the said wall means also defines a return passage which is connected to the space.

3. A logic element according to claim 1, in which the means producing the said magnetic force includes a magnetic portion of the wall means and a permanent magnet attached to the main valve member.

4. A logic element according to claim 1, in which the said aperture in the said plate defines a gap around the part of the piston slidable in the aperture, the main valve member being movable into a position in which it shuts off the said gap from the said space.

5. A logic element according to claim 4, including means on the said plate and defining a shoulder in the said space and around the said gap, the main valve member being movable against the said shoulder to shut off the said gap.

6. A logic element according to claim 1, in which the said wall means includes two plates of magnetic material with a sealing plate of non-magnetic material spacing them apart to define the said space between them, the main valve member being permanently magnetised to produce the said magnetic force.

7. A logic element according to claim 1, in which the main valve member comprises elastic material incorporating magnetised elements to form a permanent magnet, and a rigid plate to which the elastic material is attached, the said wall means including a magnetic portion.

* * * * *